United States Patent [19]

Nutter

[11] Patent Number: 4,576,763
[45] Date of Patent: Mar. 18, 1986

[54] PACKINGS FOR GAS-LIQUID CONTACT APPARATUS

[76] Inventor: Dale E. Nutter, P.O. Box 7008, Tulsa, Okla. 74105

[21] Appl. No.: 625,275

[22] Filed: Jun. 27, 1984

[51] Int. Cl.⁴ ............................................. B01F 3/04
[52] U.S. Cl. ...................................... 261/94; 55/233; 261/DIG. 72
[58] Field of Search ................. 261/94, 98, 100, 112, 261/DIG. 72; 55/90, 233; 202/158; 422/310; 210/150

[56] References Cited

U.S. PATENT DOCUMENTS

| | | | |
|---|---|---|---|
| 2,212,932 | 8/1940 | Fairlie | 261/94 |
| 2,602,651 | 7/1952 | Cannon | 261/DIG. 72 |
| 3,266,787 | 8/1966 | Eckert | 261/DIG. 72 |
| 4,041,113 | 8/1977 | McKeown | 261/98 |
| 4,067,936 | 1/1978 | Ellis et al. | 261/98 |
| 4,197,264 | 4/1980 | Degg | 261/DIG. 72 |
| 4,303,599 | 12/1981 | Strigle, Jr. et al. | 261/98 |
| 4,333,892 | 6/1982 | Ellis et al. | 261/98 X |

FOREIGN PATENT DOCUMENTS

| | | | |
|---|---|---|---|
| 49-29640 | 8/1974 | Japan | 261/DIG. 72 |
| 704648 | 12/1979 | U.S.S.R. | 261/DIG. 72 |
| 925374 | 5/1982 | U.S.S.R. | 261/DIG. 72 |
| 990277 | 1/1983 | U.S.S.R. | 261/DIG. 72 |

Primary Examiner—Richard L. Chiesa
Attorney, Agent, or Firm—Beveridge, DeGrandi and Weilacher

[57] ABSTRACT

A random dumped bed is formed of packing elements each comprising a curved base and hoops which are curved oppositely to the base. The base has a liquid channel in its concave inner surface, and openings are formed in the channel to permit liquid to flow from the channel onto the convex outer surface of the base. Two hoops project unequal distances from the base to deter axial nesting of the elements and to deter preferential orientation of the elements when they are dumped in the bed. The base has elongated slots, and nesting of the hoops in these slots is avoided by providing each hoop with nonlinear side edges and a tapered shape so that its maximum width is greater than the minimum width of a slot.

27 Claims, 10 Drawing Figures

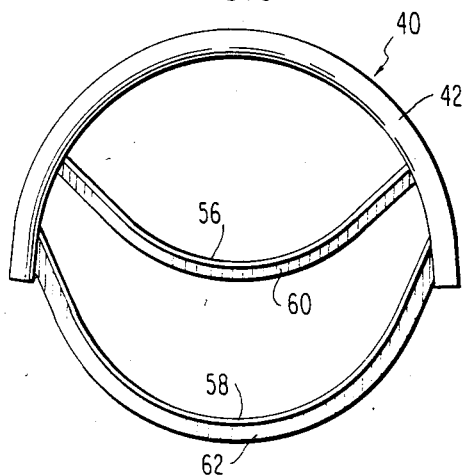
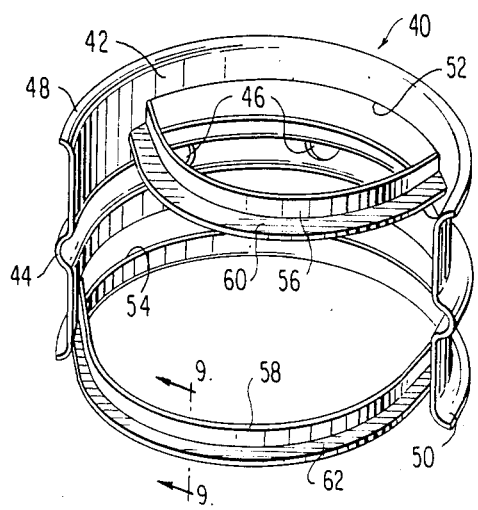
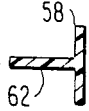
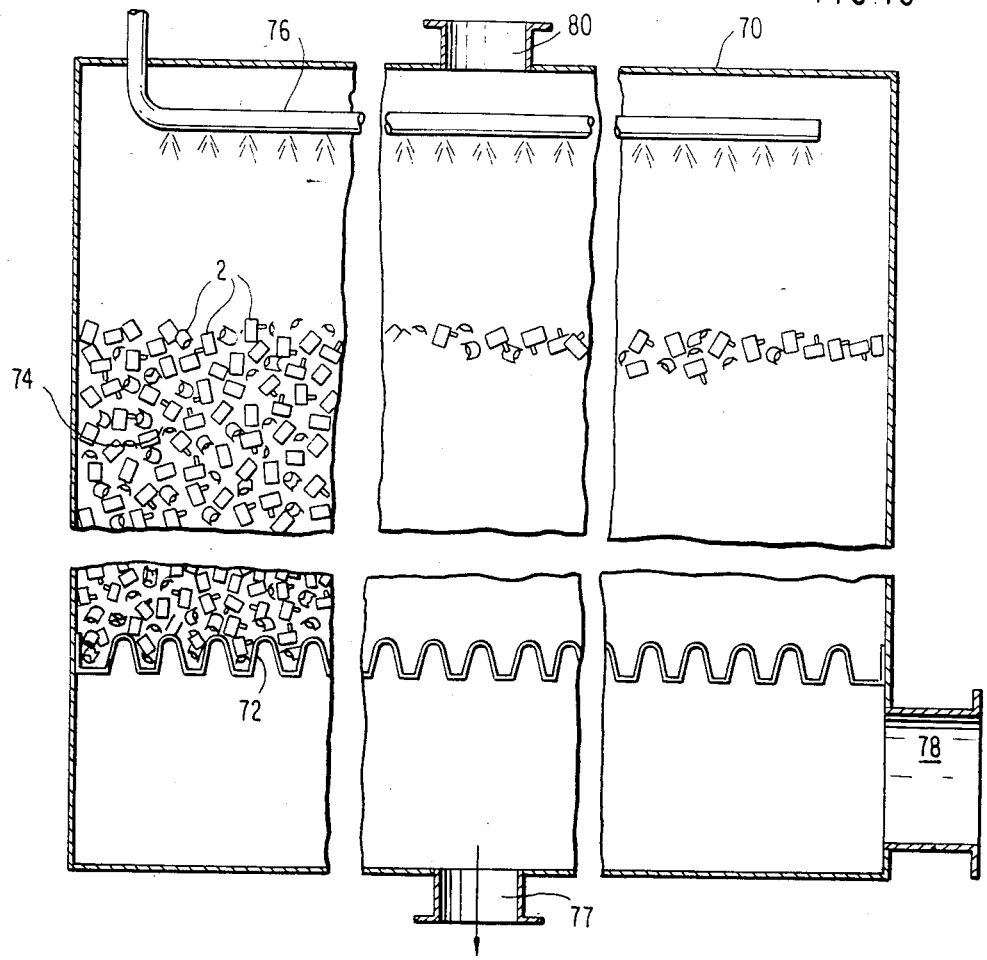

PACKINGS FOR GAS-LIQUID CONTACT APPARATUS

BACKGROUND OF THE INVENTION

This invention relates to packings for gas-liquid contact apparatus, and particularly pertains to the configurations of individual packing elements and beds formed of such elements.

The packing elements of the invention are used to form beds of dumped or randomly oriented packings. Such packings are well known in the art and are used for a wide variety of purposes in scrubbers, absorbers and distillation columns for various types of mass transfer apparatus. Typical existing packings in this category are Pall rings, Raschig rings, and packings sold under the trademarks Intalox saddles, metal Intalox and Cascade Mini-Rings. Packing elements which have some similarities to the packings of this inventions are disclosed in U.S. Pat. Nos. 4,041,113, 4,303,599 and 4,333,892, the disclosures of which are incorporated herein by reference.

Beds of random dumped packing are normally formed by dumping large quantities of packing elements on a conventional support plate which is mounted in a tower or other vessel. One type of support plate is a perforated sheet which has a sinuous or corrugated configuration so that gas can enter the bed from the peaks of the support plate without opposition from a hydrostatic head which may exist in the valleys of the support plate. After being randomly dumped on the support plate, the packing elements may be slightly agitated or raked level with a small board or other tool. There is no piece-by-piece positioning or orientation of the elements.

The vessel is sealed. In operation, gas is introduced by a gas inlet in a lower part of the vessel, and the gas is exhausted or discharged from a gas outlet in the upper part of the vessel. As the gas moves from the inlet to the outlet, it passes upwardly through the support plate and through the randomly dumped bed. Simultaneously with the ascending flow of the gas, a body of liquid is moving downwardly through the bed of packing elements. The liquid is distributed on the upper surface of the bed by means of an orifice pan, weir channel or spray nozzle distributor as is well known in the art. As the liquid moves downwardly through the bed under the influence of gravitational forces, it wets the surfaces of the elements, forming a renewing film to promote the effective contact between the gas and the liquid. The liquid eventually passes through the support plate and then flows to a liquid outlet means.

A paramount objective of the invention is to provide a packing which results in a high efficiency without an excessive pressure drop. This high efficiency is believed to be attributable to the effective wetting of the available surface of the packing, improved liquid flow and distribution on and between the individual elements at various orientations thereof, reduced liquid dripping as it flows from the elements, and some lateral flow of the liquid as it moves from element-to-element. Another major object is to obtain relatively uniform contact throughout the bed so that the gas-liquid contact activity at the center of the bed is approximately the same as the activity in the side areas and elsewhere in the bed.

Other objects are to produce a relatively uniform bed structure because the elements will not have a preferential orientation when they are dumped into the bed, to provide packing elements which resist nesting, and to provide packing elements which have a high strength with respect to their size, weight and wall thickness. The latter feature makes it possible to form deeper beds of packing without deforming the lower elements in the bed, and to use thinner gauge materials in situations where beds are of normal depth.

SUMMARY OF THE INVENTION

This invention relates to improvements in packing elements and beds for gas-liquid contact apparatus wherein a packing element has a curved base member and a bridging member which has a curvature opposite to the curvature of the base member. The ends of the bridging member are connected to the base member. The inner surfaces of the base member and the bridging member face inwardly of the element in opposite directions.

One improvement to packings of the type described in the preceding paragraph is that the base member has a channel formed in its inner surface for receiving and conducting a portion of the liquid laterally in the bed when the inner surface of the base member faces upwardly. A second improvement, applicable to packing elements which have two bridging members, is that the bridging members extend unequal distances from the base member, and they are arranged so that the packing element will have an inclined orientation when it is supported, bridging members downwardly, on a horizontal surface. Another improvement, applicable to a packing element which has an elongated slot corresponding generally in size and shape with the bridging member, is that the shape of the bridging member deters it from projecting into, i.e. nesting in, a slot of another such packing element. In this regard, the bridging member has at least one edge which is nonlinear along the length of the bridging member, and/or the bridging member has a maximum width which is greater than the minimum width of the slot.

In different geometric terminology, the invention involves improvements to packing elements which have a longitudinal reference plane extending therethrough. The element has a base and a hoop which has its opposite ends connected to the base. A midportion of the base is located on a first side of the reference plane; and, the free ends of the base and the hoop are located on the second opposite side of the reference plane. The midportion of the base and the hoops all have concave inner surfaces which face toward the reference plane, and these components have convex outer surfaces which face away from the reference plane.

One improvement to packings of this type described in the preceding paragraph is that the base has a channel formed in its inner surface for receiving and conducting a portion of the liquid laterally in the bed when the element is oriented with the inner surface of the base facing upwardly. Another improvement, applicable to such packing elements provided with two such hoops, is that these hoops extend different distances from the base and are arranged so that the packing will have an orientation wherein the reference plane is inclined when the element is supported hoops downwardly on a horizontal surface. A further improvement is applicable to packing elements in which the base has an elongated slot arranged so that its projection on the reference plane corresponds substantially with a projection of the hoop on the reference plane. To deter nesting of a hoop in a slot of another such packing element, the hoop is provided with an edge extending lengthwise thereof which has a nonlinear projection on the reference plane; and/or, the hoop has a maximum width which is greater than the minimum width of the slot.

This specification also discloses further features which are important but subordinant to one or more of the previously-described improvements. In a packing element which has a channel on its inner surface, the channel preferably extends from one free end of the base to the other free end of the base, and the base has at least one opening extending therethrough from the channel to the outer surface of the base in order to permit liquid to flow from the channel through the opening to wet the outer surface of the base. When the packing member is made of sheet material, the base has a rib means with an outwardly facing convex surface and an inwardly facing concave surface which forms the channel. This rib means also stiffens the base. The packing elements may have outturned rims at their side edges to deter the flow of liquid over the side edges when the outer surface of the base is facing upwardly. As to the configurations of the hoops or bridging members which deter nesting in the slots of similar packing elements, they may have a width which varies along the length of the hoop or bridging members, preferably increasing from a minimum width near the opposite ends of the hoop or bridging member to a maximum width near the center of the hoop or bridging member. Other features of the invention are disclosed and will be recognized by readers of this specification who are familiar with and skilled in the design of gas liquid contact apparatus.

BRIEF DESCRIPTION OF THE DRAWINGS The drawings of this specification are drawn to scale.

FIG. 7 is a perspective view of a second type of packing element constructed according to the invention, this element being formed of injection molded plastic material.

FIG. 8 is an end view of the element of FIG. 7, looking in an axial direction.

FIG. 9 illustrates the cross section of one of the hoop members in the packing element of FIG. 7, as seen along the section line 9—9 in FIG. 7.

FIG. 10 is a somewhat diagrammatic view of a bed formed of the packing elements of FIG. 1 or FIG. 7, said bed being located in a vessel provided with inlets and outlets for gas and liquid.

DETAILED DESCRIPTION

Figure 1:
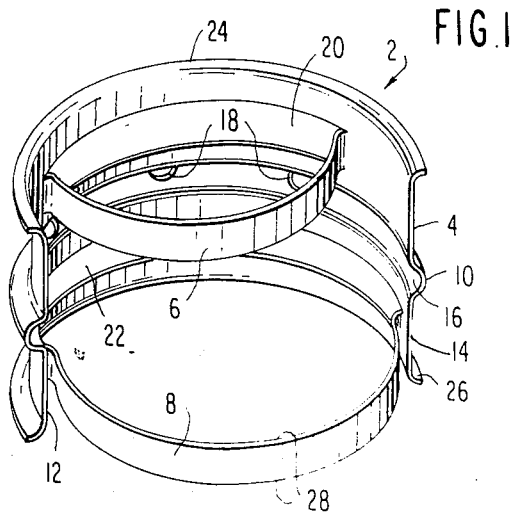
FIG. 1 is a perspective view of a packing element formed of stainless steel sheet material.
Figure 2:
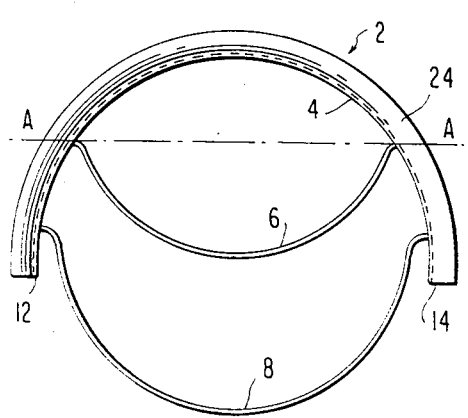
FIG. 2 is an end view of the packing element of FIG. 1, looking in an axial direction.
Figure 4:
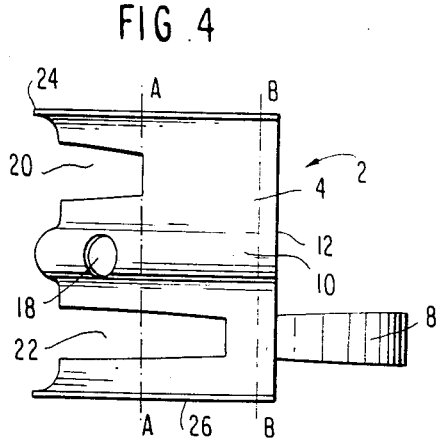
FIG. 4 is a side view of the packing element of FIG. 1, as seen from a position which is displaced 90° from the vantage point of FIG. 3.
Figure 5:
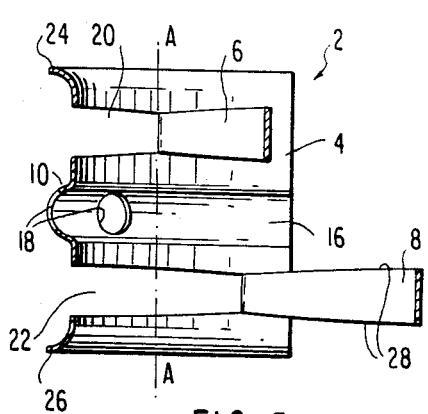
FIG. 5 is a sectional view of the packing element of FIG. 1 as seen in the direction of section line 5—5 in FIG. 3.
Figure 6:
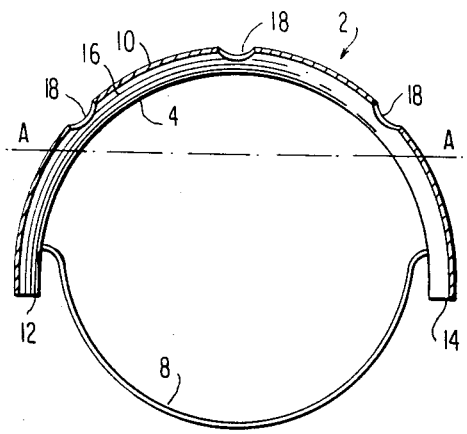
FIG. 6 is a transverse sectional view of the packing element of FIG. 1, taken along the section line 6—6 in FIG. 3.

The packing element 2 shown in FIGS. 1–6 is preferably manufactured of metal sheet material. It is formed of a curved base member 4 and two hoops 6 and 8, also referred to herein as bridging members, which are struck from and integral with the base member. As can be seen in FIGS. 1, 2 and 6, the curvature of the hoops 6 and 8 is opposite to the curvature of the base 4.

Figure 3:
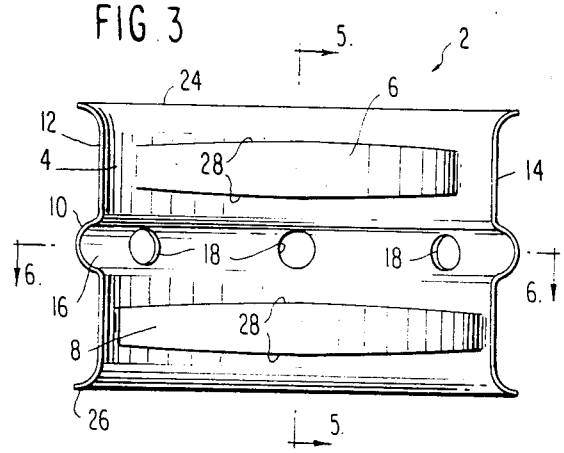
FIG. 3 is a side view of the packing element, looking toward the open end of the base member thereof.

The base 4 is a substantially semicylindrical body with a constant curvature about a central longitudinal axis which is shown at B—B in FIG. 4 and coincides with the section line 5—5 in FIG. 3. Directions which lie parallel to the axis are referred to as axial or longitudinal directions in this specification.

The base member 4 has a centrally located circumferential trough or rib 10 which extends from one free end 12 of the base to the other free end 14. This rib 10 stiffens and strengthens the base 4, and it also forms a channel 16 which serves important functions with respect to the flow of liquid through a bed of such packing elements 2. As shown in FIGS. 3 and 5, the rib 10 has an outwardly facing convex surface and an inwardly facing concave surface, the latter forming the liquid conduit or channel 16. The orientation of the channel is such that it will receive and direct the flow of liquid when the concave inner surface of the base 4 faces upwardly in a packed bed.

Three openings 18 of circular or oblong shape are formed in the rib. These openings extend through the base 4 so that liquid may flow from the channel 16, through the openings 18 and onto the convex outer surface of the base. When the apparatus is shut down, these openings 18 also permit liquid to drain from the individual elements in the bed.

On opposite sides of the center rib 10, the base member 4 is provided with a pair of circumferentially oriented elongated slots 20 and 22. The hoops 6 and 8 are formed of the metal which, prior to formation of the element 2, occupied the area of these slots so the configuration of each slot is generally similar to the configuration of its respective hoop. However, due to distortions which occur in the course of manufacture, the width of a slot is slightly less than the corresponding width of its respective hoop. These widths are measured in the axial direction of the packing element 2.

The side edges of the base are provided with outturned flanges which form rims 24 and 26. These rims stiffen and strengthen the element 2, and they also channel the liquid to deter the flow of liquid over the side edges of the base when the convex outer surface of the base is facing upwardly. The three channel design, i.e. the device which has the channel formed by the rib 10, the channel formed by the rim 24, and the channel formed by the rim 26, is particularly desirable both from the standpoint of the strength which it gives to the element and from the standpoint of liquid distribution regardless of the orientation of the packing element.

The hoops 6 and 8 have different lengths and they extend unequal distances from the base member 4. The smaller hoop 6 tends to deter nesting of one packing element 2 in an axial direction with respect to another packing element 2. The inequality of the hoops 6 and 8 also tends to promote the random orientation of the elements in a bed. This characteristic may be illustrated by considering the behavior of an element 2 when it is placed on a horizontal surface. A ring packing element will tend to take an orientation where its central axis is either vertical or horizontal. A packing element 2 of this invention is capable of these orientations but, when it is placed on the horizontal surface with its hoops facing downwardly, the central axis B—B will take an inclined orientation. The longitudinal reference plane A—A of the element, described later in this specification, will also be inclined. When at this inclined orientation, the element 2 will contact the horizontal surface at the center of the larger hoop 8 and at the two opposite corners of the base member 4.

According to one feature of the invention, the hoops 6 and 8 have a shape which deters them from nesting in the slots 20 and 22 of adjacent elements. As best shown in FIG. 3, each of the hoops 6 and 8 has nonlinear side edges 28 which extend lengthwise of the hoop. These side edges are bowed axially outwardly, providing each hoop with a tapered width which increases from a minimum width near its opposite ends to a maximum width near its center. In situations where the corresponding slot is geometrically identical to the hoop, there will not be significant nesting because only a very small part of the hoop can enter the slot. When the slot is slightly narrower than the hoop due to manufacturing distortions, even this small entry will not occur as the maximum width of the hoop is greater than the minimum width of the slot. Although the distorted slots may be rectangular, they are still considered to have a size and shape which corresponds substantially with their respective hoops.

The configuration of the element Z may also be described with respect to a longitudinal reference plane which is shown at A—A in FIGS. 2, 4 and 5. For purposes of such a description, the portion of the base member 2 lying above the plane A—A in FIG. 2 is designated the "midportion" of the base. In FIG. 2, it will be seen that the midportion of the base 2 has a concave inner side which faces the plane A—A, and a convex outer side which faces away from the plane A—A. The free ends 12 and 14 of the base lie on the opposite, second or lower side of the plane A—A. The hoops 6 and 8 are located on the lower side of plane A—A. Their concave upper sides face toward plane A—A, and their convex lower sides face away from the plane A—A. Looking in the direction of FIG. 3, the projections of the slots 20 and 22 on the plane A—A correspond substantially with the projections of their respective hoops 6 and 8 on this plane. The projections of the side edges 28 of the hoops on the reference plane are nonlinear in order to deter the hoops from nesting in the slots of other such elements.

The packing element 40 shown in FIGS. 7-9 is similar in many respect to the embodiment of FIGS. 1-6; however, the packing 40 is formed of injection molded plastic. The wall thicknesses are somewhat greater, being in the order of about 0.0625 inch. It has a curved base member 42 with a center channel-forming rib 44 which has liquid distribution and drain openings 46. The side edges of the base 42 have flanges which form rims 48 and 50. Circumferentially extending slots 52 and 54 in the base member correspond generally to the shape of the oppositely curved hoops 56 and 58. In order to strengthen the hoops in this embodiment, it is desirable to provide them with strengthening flanges 60 and 62 which are oriented in planes which lie perpendicular to the longitudinal axis of the element. As shown in FIG. 9, the crossection of one of the hoops is T-shaped.

The packing elements 2 and 40 are used to form a packed bed of the type shown in FIG. 10. A vessel 70 is provided with a conventional perforated gas-injection support plate 72, a randomly dumped bed 74 of packing elements 2 supported on the plate, and an upper liquid distributor 76 which has spray heads for distributing liquid on the upper surface of the bed 74. Other distributors such as orifice pan or weir channel types may be used. A liquid outlet opening or conduit 77 is located beneath the support plate 72. The vessel 70 has a gas inlet conduit 78 which introduces gas into the chamber beneath the support plate, and a gas outlet conduit 80 which receives gas from the upper area in the vessel. A typical vessel diameter is about six to eight feet, and a typical bed height is about twenty feet. However, these sizes may vary widely as the bed height may be from two to forty feet and the bed diameter may be from six inches to forty feet. Of course, as the diameter increases, it becomes necessary to provide midspan trusses for the support plate 72. In some systems, a vessel may have support plates and liquid distributors at several different elevations, with each plate supporting a bed of packing elements.

When the packing elements are randomly dumped in the bed, they demonstrate no preferential orientation so that they are indeed randomly distributed to provide relatively uniform density throughout the bed. Bed efficiency, measured in terms of contact per unit of surface area, is relatively high. The large hoops 8 do not nest axially in other elements to any significant extent due to the presence of the smaller hoops 6 which provide an obstacle to such nesting. Due to the configuration of the hoops 6 and 8 relative to the slots 20 and 22, the hoops do not enter and nest in the slots of other packing elements. When the packing elements are dumped in the bed, they are not damaged because they are relatively strong, this strength being attributable in large part to the center rib 10, both by itself and in combination with the rims 24 and 26.

When the apparatus is in operation, gas flowing upwardly through the bed comes into intimate contact with the renewing films of liquid formed on the packing elements 2. The improved packing element of this invention has an influence on both gas and liquid flow distribution. With respect to the flow of liquid the base of each packing element will provide a conduit which serves to channelize and carry the liquid to a discharge point which often will be laterally displaced at the end of the base 4 or at a point where the base 4 physically contacts another member which will receive the liquid. For example, when the hoops 6 and 8 are facing upwardly, the liquid will tend to flow in the center channel to points where it either flows through one of the openings 18 or from an end 12 or 14 of the base. When the disposition is such that the liquid flows through the holes, it has been observed that there is a tendency for this liquid to wet and form a film on the lower convex side of the base 4. Of course, the presence of this film provides greater contact and contributes to the efficiency of the apparatus. If the hoops are facing downwardly so that the liquid is received on the upper convex portion of the base 4, one or both of the outer rims will normally provide a conduit for carrying the liquid to a discharge point located at the ends of the base. At this orientation, gas flowing upwardly through the openings 18 creates some turbulence and dispersion which is also believed to be a desirable attribute in this situation.

The metal packing elements of FIGS. 1-6 are normally formed of metal sheet material in a high speed punch press equipped with multiple stage dies. After being formed, the elements can be roughened in an abrasive tumbling machine or by glass bead blasting to provide them with an activated surface finish which is rather dull. The packing elements shown in FIGS. 5 and 6 may be formed in injection molding machines of a variety of well-known compounds including polyethylene, polyvinyl chloride, polytetrofluoroethylene, polypropylene, PFA fluoroplastic or poly (vinylidene fluoride).

Dimensionally, the elements 2 are formed of metal sheeting having a thickness of 0.015 inch to 0.018 inch, depending the packing size and other factors which govern the anticipated strength requirements of these elements. Several sizes are possible. In the illustrated packing element, identified commercially as a "number two" packing due to its diameter of approximately two inches, the outside radius of the rim of the constant curvature base shown in FIGS. 1-6 is 1.125 inches. The other dimensions may be determined from these drawings which have been drawn to scale, but it is mentioned here that the radius of the larger hoop is 0.875 inch, and the axial length of the packing element 2 is 1.375 inches. The widths of the hoops 6 and 8 vary along their length from a minimum of 0.1875 inch near the opposite ends of the hoops to a maximum of 0.25 inch at their centers. The widths of the slots 20 and 22 are equal to but preferably slightly less than the corresponding widths of their respective hoops. The heights of the rib 10 and rims 24 and 26 are about 0.125 inch, and the diameter of each of the openings 18 is about 0.188 inch.

Persons familiar with the art will realize that the invention may take a variety of forms other than the embodiments disclosed herein. For example, the base members and hoops may have varying radii of curvature along their lengths or, in some instances, they may be formed of a series of linear segments which collectively form a curved, concave or convex shape. The base member and the hoops may be Vee shaped looking axially within the invention as claimed herein. The elements may be smaller or larger, from ⅜ inch to 3 inch diameter, and their dimensions may be varied proportionally to those in the preceding paragraph. The elements may be provided with fewer hoops or more hoops than are shown in the drawings. In view of the many forms which the invention may take, it is emphasized that it is not limited solely to the disclosed embodiments but is embracing of a variety of structures which fall within the spirit of the following claims.

I claim:

1. A packing element for a bed of packing in gas-liquid contact apparatus, said packing element having a base, a hoop having opposite ends connected to said base, said base having a midportion and two free ends, said midportion of the base being located on a first side of a reference plane which extends longitudinally through said element, said free ends of the base being located on a second side of the longitudinal reference plane, said second side being opposite from said first side, said hoop being located on the second side of the longitudinal reference plane, said midportion of the base having a concave inner surface which faces toward the longitudinal reference plane and a convex outer surface which faces away from said longitudinal reference plane, said hoop having a concave inner surface which faces toward the longitudinal reference plane and a convex outer surface which faces away from said longitudinal reference plane, said base having a channel formed in its inner surface for receiving and conducting a portion of the liquid laterally in the bed when the element is oriented with the inner surface of the base facing upwardly, said packing element being made of sheet material which has a rib means therein for stiffening said base and forming said channel, said rib means having a concave surface facing inwardly and a convex surface facing outwardly, at least one opening extending through the base from the channel to the outer surface of the base, said opening being operable to permit liquid to flow from said channel through said opening to wet the outer surface of the base, said base having side edges with outturned rim means formed therein to deter the flow of liquid over said side edges when the outer surface of the base is facing upwardly.

2. A packing element according to claim 1 wherein said channel extends from one free end of the base to the other free end of the base.

3. A packing element according to claim 1 wherein the base has slots located on opposite sides of said channel, said slots being arranged so that projections of said slots on said reference plane correspond substantially with projections of said hoops on said reference plane.

4. A packing element according to claim 1 wherein the base has elongated slots arranged so that projections of the slots on the reference plane correspond substantially with projections of said hoops on said reference plane, one said hoop extending beyond the reference plane a greater distance than the free ends of the base, said one hoop having an edge extending lengthwise thereof which has a nonlinear projection on said reference plane in order to deter the nesting of said hoop in a slot of another such packing element.

5. A packing element according to claim 1 having at least two said hoops, said hoops extending different distances from the base and being arranged so that the packing element will have an orientation where the reference plane is inclined when the element is supported hoops downwardly on a horizontal surface.

6. A plurality of packing elements according to claim 1, said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

7. A packing element for a bed of packing in gas-liquid contact apparatus, said packing element having a base, at least two hoops each having opposite ends connected to said base, said hoops extending different distances from the base, said base having a midportion and two free ends, said midportion of the base being located on a first side of a reference plane which extends longitudinally through said element, said free ends of the base being located on a second side of the longitudinal reference plane, said second side being opposite from said first side, each of said hoops being located on the second side of the longitudinal reference plane, said midportion of the base having a concave inner surface which faces toward the longitudinal reference plane and a convex outer surface which faces away from said longitudinal reference plane, said hoops having concave inner surfaces which face toward the longitudinal reference plane and convex outer surfaces which face away from said longitudinal reference plane, said base having elongated slots therein arranged so that projections of said slots on said reference plane correspond substantially with projections of said hoops on said reference plane, a said hoop having a side edge extending lengthwise thereof which has a nonlinear projection on said reference plane in order to deter the nesting of said hoop in a slot of another such packing element.

8. A packing element according to claim 7 wherein a hoop has a width which varies along the length of the hoop.

9. A packing element according to claim 7 wherein a hoop has a width which increases from a minimum width near the opposite ends of the hoop to a maximum width near the center of the hoop.

10. A packing element according to claim 7 wherein the width of the slot is less than the corresponding width of its respective hoop.

11. A packing element according to claim 7 wherein the base has a channel formed in its inner surface for receiving and conducting a portion of the liquid laterally in the bed when the element is oriented with its concave side facing upwardly.

12. A plurality of packing elements according to claim 7, said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

13. A packing element for a bed of packing in gas-liquid contact apparatus, said packing element having a base, at least two hoops each having opposite ends connected to said base, said hoops extending different distances from the base, said base having a midportion and two free ends, said midportion of the base being located on a first side of a reference plane which extends longitudinally through said element, said free ends of the base being located on a second side of the longitudinal reference plane, said second side being opposite from said first side, said hoops being located on the second side of the longitudinal reference plane, said midportion of the base having a concave inner surface which faces toward the longitudinal reference plane and a convex outer surface which faces away from said longitudinal reference plane, said hoops having concave inner surfaces which toward the longitudinal reference plane, and convex outer surfaces which face away from said longitudinal reference plane, said base having elongated slots therein arranged so that projecting of said slots on said reference plate correspond substantially with projections of said hoops on said reference plane, a said hoop having a maximum width which is greater than the minimum width of the slot to deter nesting of said hoop in a slot of another such packing element.

14. A packing element according to claim 13 wherein a hoop has a width which varies along the length of the hoop.

15. A packing element according to claim 13 wherein a hoop has a width which increases from a minimum width near the opposite ends of the hoop to a maximum width near the center of the hoop.

16. A packing element according to claim 13 wherein the base has a channel formed in its inner surface for receiving and conducting a portion of the liquid laterally in the bed when the element is oriented with its concave side facing upwardly.

17. A plurality of packing elements according to claim said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

18. A packing element for a bed of packing in gas-liquid contact apparatus, said packing element having a curved base member; said base member having an inner surface, an outer surface, two side edges and two ends;
   a bridging member having a curvature which is opposite to the curvature of the base member; said bridging member having an inner surface, an outer surface, two side edges and two ends;
   said ends of the bridging member being connected to said base member, said inner surfaces of the base member and bridging member facing inwardly of the packing element in opposite directions, said base member having a channel formed in its inner surface for receiving and conducting a portion of the liquid laterally in the bed when the element is oriented with the inner surface of the base member facing upwardly,
   said packing element being made of sheet material which has a rib means therein for stiffening said base and forming said channel, said rib means having a concave surface facing inwardly and a convex surface facing outwardly,
   at least one opening extending through the base member from the channel to the outer surface of the base member, said opening being operable to permit liquid to flow from said channel through said opening to wet the outer surface of the base member,
   said side edges of the base member having outturned flange means formed therein to deter the flow of liquid over said side edges when the outer surface of the base member is facing upwardly.

19. A plurality of packing elements according to claim 18, said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

20. A packing element for a bed of packing in gas-liquid contact apparatus, said packing element having a curved base member; said base member having an inner surface, an outer surface, two side edges and two ends;
   at least two bridging members having curvatures which are opposite to the curvature of the base member; each of said bridging members having an inner surface, an outer surface, two side edges and two ends;
   said ends of the bridging members being connected to said base member, said inner surfaces of the base member and bridging members facing inwardly of the packing element in opposite directions, said base member having elongated slots which correspond generally in shape and size with said bridging members, said slot having opposite ends which extend to the ends of the bridging members, a said bridging member having at least one side edge which is nonlinear along the length of the bridging member in order to deter nesting of said bridging member in a slot of another such packing element, said bridging members extending different distances from the base member.

21. A pack element according to claim 20 wherein the bridging member with a nonlinear side edge has a width which varies along the length of the bridging member.

22. A packing element according to claim 20 wherein the bridging member with a nonlinear side edge has a width which increases from a minimum width near the opposite ends of the bridging member to a maximum width near the center of the bridging member.

23. A plurality of packing elements according to claim 20, said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

24. A packing element for a bed of packing in gas-liquid contact apparatus, said packing element having a curved base member; said member having an inner surface, an outer surface, two side edges and two ends;
at least two bridging members having curvatures which are opposite to the curvature of the base member; each of said bridging members having an inner surface, an outer surface, two side edges and two ends;
said ends of the bridging members being connected to said base member, said inner surfaces of the base member and bridging members facing inwardly of the packing element in opposite directions, said base member having elongated slots which corresponds generally in shape and size with said bridging members, said slots having opposite ends which extend to the ends of the bridging members, a said bridging member having a maximum width which is greater than the minimum width of the slot to deter nesting of the bridging member in a slot of another such packing element,
said bridging members extending different distances from the base member.

25. A packing element according to claim 24 wherein a said bridging member has a width which varies along the length of the bridging member.

26. A packing element according to claim 24 wherein a bridging member has a width which increases from a minimum width near the opposite ends of the bridging member to a maximum width near the center of the bridging member.

27. A plurality of packing elements according to claim 24, said packing elements being randomly oriented and forming a bed, a vessel enclosing said bed, means for introducing liquid into said vessel above said packing elements so that the packing elements are wetted by the liquid, and means for flowing a gas through said bed to provide contact between the gas and the liquid which wets the packing elements.

* * * * *